(12) United States Patent
Arrowsmith et al.

(10) Patent No.: US 7,660,198 B2
(45) Date of Patent: Feb. 9, 2010

(54) PASSIVE SEISMIC EVENT DETECTION

(75) Inventors: Stephen Arrowsmith, Addison, TX (US); Leo Eisner, Cambridge (GB)

(73) Assignee: WesternGeco LLC, Houston, TX (US)

(*) Notice: Subject to any disclaimer, the term of this patent is extended or adjusted under 35 U.S.C. 154(b) by 211 days.

(21) Appl. No.: 10/561,356

(22) PCT Filed: Jun. 17, 2004

(86) PCT No.: PCT/GB2004/002614

§ 371 (c)(1),
(2), (4) Date: Jun. 30, 2006

(87) PCT Pub. No.: WO2005/006020

PCT Pub. Date: Jan. 20, 2005

(65) Prior Publication Data

US 2006/0285438 A1      Dec. 21, 2006

(30) Foreign Application Priority Data

Jul. 5, 2003     (GB) .............................. 0315790.6

(51) Int. Cl.
*G01V 1/30* (2006.01)
(52) U.S. Cl. ..................... 367/40; 367/31; 367/42; 702/15
(58) Field of Classification Search ............... 367/38, 367/40, 42, 31; 702/15
See application file for complete search history.

(56) References Cited

U.S. PATENT DOCUMENTS 5,747,750 A * 5/1998 Bailey et al. ................ 181/112

(Continued)

FOREIGN PATENT DOCUMENTS

EP      1 074 858 A1      7/2000

(Continued)

OTHER PUBLICATIONS

Brancato, et al. "High precision relocation of microearthquakes at Mt. Etna (1991-1993 eruption onet): a tool for better understanding of volcano seismicity." Elsevier, Journal of Volcanology and Geothermal Research 124 (Apr. 18, 2003).*

(Continued)

*Primary Examiner*—Scott A Hughes
(74) *Attorney, Agent, or Firm*—James McAleenan; Jody Lynn DeStefanis; Dale Gaudier

(57) ABSTRACT

A method of identifying passive seismic events in seismic data that contains at least first seismic data traces acquired at a first seismic receiver and second seismic data traces acquired at a second receiver spatially separated from the first receiver comprises determining an overall measure of similarity for a pair of events in the seismic traces. The overall measure of similarity is indicative of similarity between the events acquired at the first seismic receiver and of similarity between the events acquired at the second seismic receiver. In one method, the overall measure of similarity is an overall cross-correlation coefficient. The overall cross-correlation coefficient is found by determining a first correlation coefficient for the pair of events from the data acquired at the first receiver and determining a second correlation coefficient for the pair of events from the data acquired at the second receiver. The overall correlation coefficient for the pair of events may be obtained from the first correlation coefficient and the second correlation coefficient by an averaging process. The overall measure of similarity may be compared with a threshold to determine whether the pair of events form a doublet. The method makes possible real-time or near-real-time identification of doublets.

15 Claims, 6 Drawing Sheets

U.S. PATENT DOCUMENTS

| | | | |
|---|---|---|---|
| 5,774,417 A * | 6/1998 | Corrigan et al. | ............... 367/24 |
| 6,018,498 A | 1/2000 | Neff et al. | |
| 6,598,001 B1 | 7/2003 | Deflandre | |
| 6,665,335 B1 * | 12/2003 | Rajagopal et al. | ........... 375/224 |
| 6,947,843 B2 * | 9/2005 | Fisher et al. | .................. 702/13 |
| 7,277,797 B1 * | 10/2007 | Kunitsyn et al. | .............. 702/15 |
| 2001/0047245 A1 | 11/2001 | Cheng et al. | |
| 2004/0006430 A1 * | 1/2004 | Harmon et al. | ............... 702/14 |

FOREIGN PATENT DOCUMENTS

| | | |
|---|---|---|
| EP | 1 074 858 B1 | 7/2000 |
| WO | 97/39367 A1 | 10/1997 |
| WO | 98/09182 A1 | 3/1998 |

OTHER PUBLICATIONS

Badawy, et al. "Analysis of the southeast Beni-Suef, northern Egypt earthquake sequence." Journal of Geodynamics 33 (2002).*

Rowe, et al. "Using Automated, High-precision Repicking to Improve Delineation of Microseismic Structures at the Soultz Geothermal Reservoir." Pure and Applied Geophysics 159 (2002).*

Poupinet et al Monitoring Velocity Variations in the Crust using Earthquake Doublets: An Application to the Calaveras Fault, California Journal of Geophysical Research, vol. 89, Jul. 1984, pp. 5719-5731.

Moriya et al Precise source location of AE Doublets by Spectral Matrix Analysis of the Triaxial Hodogram Geophysics, vol. 59, Jan. 1994, pp. 36-45.

Waldhauser et al A Double-Difference Earthquake Location Algorithm: Method and Application by the Northern Hayward Fault, California Bulletin of the Seismological Society of America, vol. 90, Dec. 2000, pp. 1353-1368.

Vance et al Improved Determination of Microseismic Source Location using a Simplex Technique IEEE Transactions on Industry Applications, vol. 24, Jul./Aug. 1988, pp. 666-671.

* cited by examiner

PASSIVE SEISMIC EVENT DETECTION

FIELD OF THE INVENTION

The present invention relates to a method of processing seismic data, in particular to identify seismic events arising from passive seismic events including for example microseismic activity in a hydrocarbon reservoir, a nuclear waste repository, or a mine, or in seismology.

BACKGROUND TO THE INVENTION

FIG. 1 is a schematic view of a hydrocarbon reservoir. In essence, a hydrocarbon reservoir consists of layers of the earth's interior in which hydrocarbons have accumulated. Only one hydrocarbon-bearing layer 2 is shown in FIG. 1, for convenience of description. In FIG. 1 the structure of the earth overlying the hydrocarbon-bearing layer 2 is represented as a single layer 1, but in practice it will consist of many layers having different geological compositions. Similarly, the structure of the earth below the hydrocarbon-bearing layer 2 will in practice consist of many layers but is represented in FIG. 1 as a single layer 3.

Microseismic activity, or "microseismicity", in hydrocarbon reservoirs can be induced as a result of extraction of hydrocarbons from the reservoir, which has the effect of altering the weight distribution of the hydrocarbon-bearing layer 2 and of the overlying layer 1. Microseismicity may also be induced by hydraulic fracturing operations. When microseismic activity occurs, seismic waves are generated at a point within the earth's interior. The seismic waves propagate through the earth, and may be detected by seismic receivers located within the earth. Microseismic activity induced by hydrocarbon extraction is weak and cannot generally be detected by seismic receivers at the earth's surface, although earthquake-induced microseismic activity can generally be detected by receivers at the earth's surface.

In principle, microseismic activity can occur anywhere in the reservoir layer 2 of FIG. 1, in the overlying layer 1 or in the surrounding rock. In practice, however, the earth's structure contains geological fractures or other faults, and microseismic activity preferentially occurs along or in the vicinity of such faults or fractures. In FIG. 1, a fault 4 is schematically depicted in the hydrocarbon bearing layer 2. It is assumed that the earth's interior to the right of the fault 4 is tending to move downwards whereas the earth's interior to the left of the fault 4 is tending to move upwards as indicated by the arrows A,B in FIG. 1. If a portion of the fault at one location 5 slips, microseismic activity occurs at that location 5. The slippage will relax tension at the location 5 on the fault where slippage occurs, but will induce tension at neighbouring locations along the fault and this increased tension may give rise to slippage, and consequent microseismic activity, at a nearby location 6 on the same fault 4. The time delay between microseismic activity at one location 5 and microseismic activity at the nearby location 6 may be of the order of seconds or minutes, or it may be of the order of days or even weeks.

The seismic energy produced by the microseismic activity occurring at locations 5,6 will be detected by seismic receivers 7,8,9 disposed in a borehole 10. The seismic data acquired at the receivers 7,8,9 therefore contain events arising from microseismic activity—or "microseismic events"—in addition to microseismic events arising from other faults in the layers 1,2.

Where microseismic activity occurs along a geological fault or fracture, microseismic activity is, as explained above, often found to occur at two nearby locations, such as the locations 5,6 in FIG. 1. Since the two locations are near to one another, the focusing effects of the overlying layers on seismic waves emitted at one location 5 will be similar to the focusing effects of the overlying layers on seismic waves emitted at the nearby location 6. Furthermore, since the microseismic activity at each location 5,6 arises from slippage of the fault 4, microseismic activity at one location 5 has the same source mechanism as microseismic activity at the nearby location 6. Thus, microseismic activity occurring at location 5 and microseismic activity occurring at the nearby location 6 would produce similar recordings at a seismic receiver, since the two locations are close to one another and have similar focusing mechanisms to one another, and since the microseismic activity has the same source mechanism at each location. Data acquired at a receiver will therefore contain an event corresponding to microseismic activity at location 5 and an event corresponding to microseismic activity at location 6. The two events will have a similar form, and will be separated by a time delay of, typically, from seconds to days or even weeks. Such pairs of events in acquired seismic data are known as multiple acoustic emissions or "doublets". The effect of the relative positions of the receiver and the event locations 5,6 on the time delay between the two events acquired at a receiver is small, typically of the order of $10^{-1}$ to $10^{-2}$ seconds, so the time delay is determined primarily by the time delay between microseismic activity at one location and microseismic activity at the other location. (The effect of the relative locations of the receiver and the events on the time delay between the two events arises primarily from a change in the azimuth of the receiver with respect to the doublet orientation.)

It is desirable to identify doublets in seismic data acquired at seismic receivers in a hydrocarbon reservoir. As is known, once a doublet has been identified it is possible to determine the relative location of the microseismic activity giving rise to each event (the location of the microseismic activity giving rise to an event will be referred to as the "location of an event", for convenience). The relative locations of the two events of a doublet—that is, the location of one event of the doublet relative to the location of the other event—may be determined more precisely then their absolute locations. The events and their accurate relative locations can be used for fault delineation, permeability estimation, tracking of flood fronts, stress transfer, etc.

ACKNOWLEDGEMENT OF THE PRIOR ART

Initially, doublets in seismic data were identified manually. This is possible in earthquake studies. However, during hydrocarbon extraction a continuous seismic record is kept, and this record may extend for months, even years—so manual identification of doublets is not possible.

Techniques for determining the relative locations of doublet acoustic emissions have been reported by, for example, G. Poupinet et al. in "Monitoring Velocity Variations in the Crust Using Earthquake Doublets: An Application to the Calaveras Fault, California", Journal of Geophysical Research, 89, 5719-5731 (1984), by H. Moriya et al. in "Precise source location of AE doublets by spectral matrix analysis of the triaxial hodogram": Geophysics, 36-45 (1994), and by F. M. Waldhauser and W. L Ellsworth in "A Double-Difference Earthquake Location Algorithm: Method and Application to the Northern Hayward Fault, California", Bulletin of the Seismological Society of America, 90, 1353-1368 (2000). However, there is currently no available method that enables doublets in a large seismic dataset to be identified quickly and easily with minimal operator intervention.

STATEMENT OF THE INVENTION

A first aspect of the present invention provides a method of processing seismic data, the seismic data comprising at least first seismic data traces acquired at a first seismic receiver and second seismic data traces acquired at a second receiver spatially separated from the first receiver, the method comprising: determining an overall measure of similarity for a pair of passive seismic events in the seismic traces, the overall measure of similarity being indicative of similarity between the events acquired at the first seismic receiver and of similarity between the events acquired at the second seismic receiver.

Passive seismic events are events that are not caused by the intentional activation of a controllable seismic source. Such controllable seismic sources are seismic explosive charges in shallow holes at the surface, airguns and Vibroseis ™-type vibrators. Passive seismic events are for example microseismic events, events triggered by normal drilling activity or productions or wellbore stimulation operations. In this description, passive seismic events and microseismic events or activity are used as synonyms.

When microseismic activity at two nearby locations gives rise to a doublet in acquired seismic data, the doublet will appear in the seismic data as two similar events with a time delay between them. The present invention makes use of the fact that, where events due to microseismic activity occur in seismic data acquired at two or more receivers, the microseismic activity will give rise to corresponding doublets in the seismic data acquired at each receiver. Thus, if a doublet exists there should be a high degree of similarity between the two events in the data acquired at the first receiver (indicative of the occurrence of two events that are similar to one another in the or each data trace acquired at the first receiver) and a high degree of similarity within the data acquired at the second receiver (indicative of the occurrence of two events that are similar to one another in the or each data trace acquired at the second receiver). The overall measure of similarity may be simply compared with a pre-set threshold, to provide a simple test for the presence of a doublet. Decomposition of the acquired data into P- and S-constituents is not required.

The method of the present invention may be automated, and performed with minimal operator intervention. This allows doublets in acquired seismic data to be identified quickly and easily. As explained above, acquired seismic data will typically contain events arising from many faults, and the invention makes it possible to identify events arising from the same fault.

A multiplet in seismic data is a group of doublets which have events in common—the simplest multiplet is a pair of doublets in which one event is common to both doublets. Once doublets have been identified by the method of the present invention, it is then possible to identify multiplets by grouping doublets that contain a common event.

The present invention makes it possible to identify doublets in real-time or in near real-time.

In a preferred embodiment the measure of similarity is a correlation coefficient indicative of correlation between the events acquired at the first seismic receiver and of correlation between the events acquired at the second seismic receiver.

In a preferred embodiment the method comprises:
(a) determining a first correlation coefficient for the pair of events from the first data traces;
(b) determining a second correlation coefficient for the pair of events from the second data traces; and
(c) determining the overall correlation coefficient for the pair of events from the first correlation coefficient and the second correlation coefficient.

When two events in the first seismic data traces (i.e., in the data acquired by the first receiver) are similar to one another, the first correlation coefficient will generally have a maximum value at a certain time lag. If the two events are a doublet, then data acquired at a nearby receiver should also contain a pair of events that have the same, or similar, time lag—since the microseismic activity should give rise to corresponding doublets in the data acquired at each receiver. The principle of the present invention is to identify events occurring with the same time lag (within a time window compensating for the difference between the time lag at one receiver and the time lag at the other receiver arising from the separation between receivers) in data acquired at each of two or more receivers. A pair of events that are present in the seismic data acquired at the first receiver but that have no corresponding events in the seismic data acquired at the second receiver (and so are unlikely to represent a doublet) will be given low weight in step (c). Thus, making use of the correlation coefficient of seismic data acquired at one receiver and the correlation coefficient of seismic data acquired at a second receiver provides more accurate identification of a doublet than if data from just one receiver is used.

Furthermore, the two events of a doublet normally have very similar shapes in acquired seismic data traces. As a result, a doublet generally has a high correlation coefficient. Comparing the overall correlation coefficient with a pre-determined threshold, and rejecting pairs of events having a cross-correlation coefficient below this threshold, provides a simple and accurate way of identifying doublets.

A second aspect of the present invention provides a method of seismic data acquisition comprising: acquiring first seismic data at a first seismic receiver and simultaneously acquiring second seismic data at a second seismic receiver spatially separated from the first seismic receiver; and processing the first and second seismic data according to a method of the first aspect of the invention.

A third aspect of the invention provides an apparatus for processing seismic data, the seismic data comprising first data acquired at a first seismic receiver and second seismic data acquired at a second receiver spatially separated from the first seismic receiver, the apparatus comprising means for determining an overall measure of similarity for a pair of events in the seismic traces, the overall measure of similarity being indicative of similarity between the events within the first data traces and of similarity between the events within the second data traces.

The apparatus may comprise a programmable data processor.

A fourth aspect of the present invention provides a storage medium containing a program for the data processor of an apparatus according to the third aspect of the invention.

A fifth aspect of the invention provides a storage medium containing a program for controlling a programmable data processor to carry out a method of the first aspect of the invention.

A sixth aspect of the invention provides a program for controlling a computer programmable data processor to carry out a method of the first aspect of the invention.

Further preferred features of the invention are set out in the dependent claims.

BRIEF DESCRIPTION OF THE DRAWINGS

Preferred embodiments of the present invention will now be described by way of illustrative example with reference to the accompanying figures, in which:

FIGS. 3(*b*) and 3(*c*) illustrate examples of features of the method of FIG. 3(*a*);

DETAILED DESCRIPTION OF THE PREFERRED EMBODIMENTS

A preferred embodiment of the invention will be described in which the overall measure of similarity is an overall correlation coefficient. However, the invention is not limited to use of an overall correlation coefficient as the overall measure of similarity and, in principle any quantity which gives a measure of the similarity between two waveforms may be used.

This embodiment of the invention is based on waveform correlation. The cross-correlation coefficient $c_{xy}$ between a first waveform $x(t)$ and a second waveform $y(t)$ is a dimensionless quantity that gives a measure of the similarity between the waveform $x(t)$ and the waveform $y(t)$. The cross-correlation coefficient is defined as:

$$c_{xy}(\tau) = \frac{\int_{-\infty}^{\infty} x(t)y(t+\tau)dt}{\sqrt{\int_{-\infty}^{\infty} x^2(t)dt \int_{-\infty}^{\infty} y^2(t)dt}} \quad (1)$$

In equation (1), $x(t)$ is the time series denoting the first waveform, and $y(t)$ is the time series denoting the second waveform. $y(t+\tau)$ denotes the time series for the second waveform shifted by a delay time $\tau$.

The cross-correlation coefficient is a function of the delay time $\tau$. If $x(t)$ and $y(t)$ are generally similar waveforms, but one is time-shifted relative to the other by a time $\tau_0$, the cross-correlation coefficient of the two waveforms would contain a maximum at a delay time of $\tau=\tau_0$. The magnitude of the cross-correlation coefficient takes a value between 1 and −1, with a value of 1 indicating exact correlation between the two waveforms and a value of zero indicating that the two waveforms are completely un-correlated with one another. A negative value of the cross-correlation coefficient indicates that the two waveforms are anti-correlated (i.e., that one waveform is correlated with the negative of the other waveform).

In equation (1) above the cross-correlation coefficient is calculated in the time domain. It may alternatively be calculated in the frequency domain, by analogy with the convolution theorem, according to:

$$c_{xy}(\tau) = \frac{1}{N} F_D^{-1}[X^*(f)Y(f)] \quad (2)$$

In equation (2), $F_D^{-1}$ denotes the inverse discrete Fourier transform, $X^*(f)$ is the complex conjugate of the Fourier transform of $x(t)$, $Y(f)$ is the Fourier transform of $y(t)$ and N is the number of data points.

Figure 2:
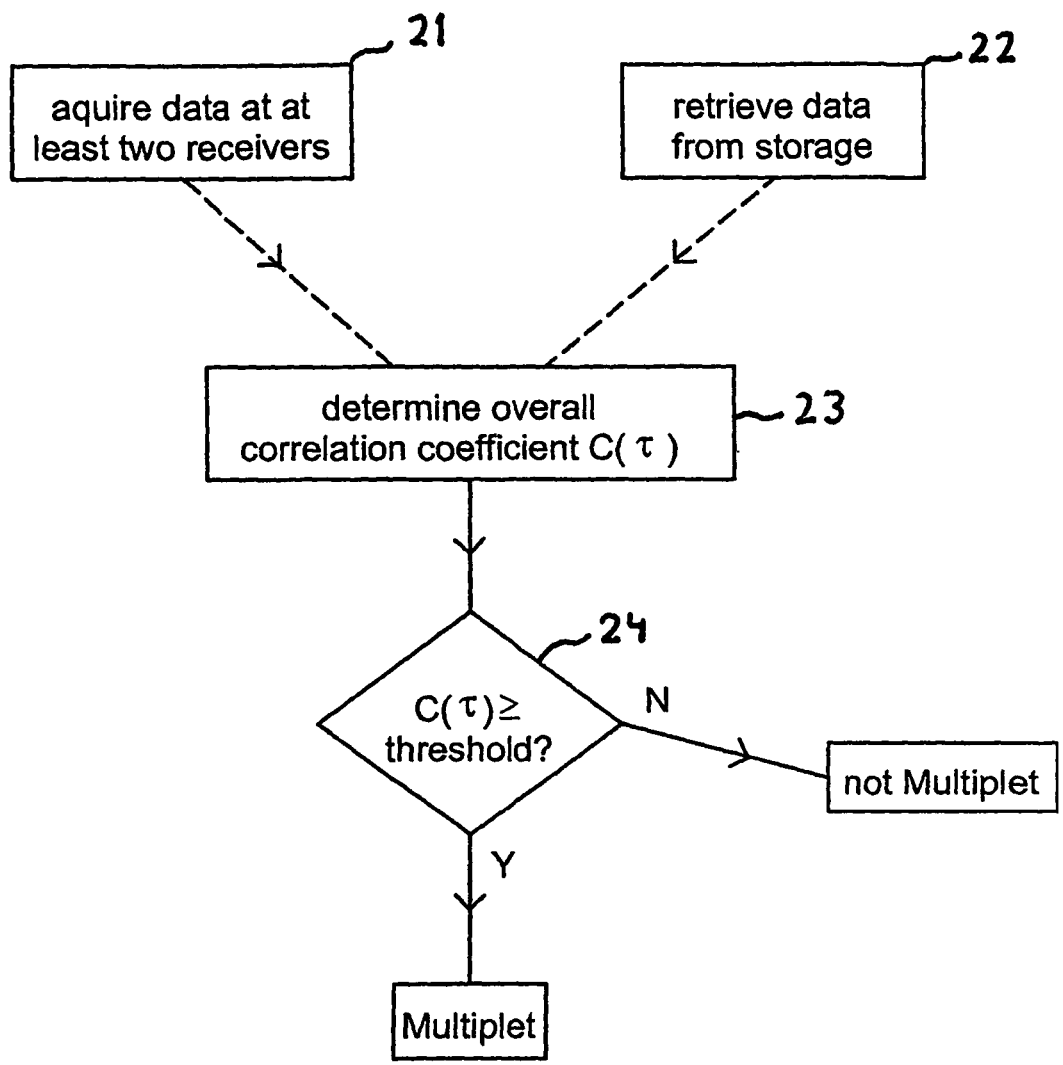
FIG. 2 is a schematic flow diagram of a method of the invention.

FIG. 2 is a schematic diagram of one method of the present invention.

Figure 1:
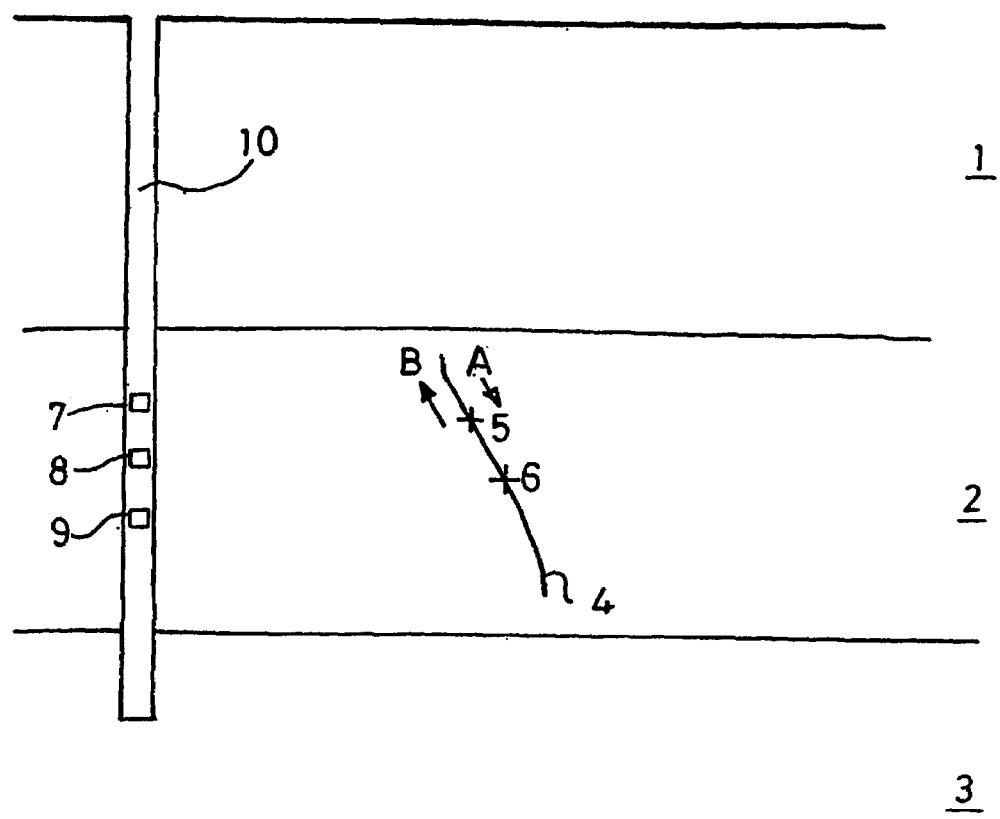
FIG. 1 is a schematic illustration of the occurrence of doublets in seismic data.

Initially at step 21, seismic data traces are acquired at at least two spatially separated seismic receivers. An arrangement of three receivers, as shown in FIG. 1, may be used but the invention is not limited to three receivers and may alternatively be carried out using two receivers or using more than three receivers. At least one seismic data trace is acquired for each receiver. In general, each receiver will acquire more than one trace, with each trace representing a different component of the seismic wavefield—and commonly each receiver will acquire three traces, representing the x-, y- and z-components. The seismic data traces are acquired simultaneously at each receiver, so that the emission of acoustic energy in the survey area will, in general, produce an event in the seismic data traces acquired at each of the receivers.

The method may alternatively be applied to pre-existing seismic data. In this case, step 21 is not carried out and is replaced by step 22 of retrieving pre-existing seismic data from storage.

At step 23, the overall cross-correlation coefficient of the acquired seismic data, for a pair of seismic events, is determined. This step is described in more detail below. As indicated above, the overall cross-correlation coefficient is indicative of the correlation between a pair of events within the data traces acquired at each receiver.

At step 24, the overall cross-correlation coefficient for the pair of seismic events is compared with a pre-determined threshold. The threshold may be defined by the user and may depend on, for example, the noise in the seismic data traces. For example, a user may decide that, for a particular set of acquired seismic data, an overall cross-correlation coefficient of 0.9 or greater indicates a doublet and, in this case, step 24 comprises determining whether the overall cross-correlation coefficient is equal to or greater than 0.9. If the result of the step 4 is that the overall cross-correlation coefficient is less than the pre-determined threshold, it is judged that the pair of events do not form a doublet. A "yes" determination at step 4 may be taken as indicating that the pair of seismic events form a doublet.

In this embodiment, therefore, a pair of events is identified as a doublet if the overall correlation coefficient is equal to or greater than a pre-set threshold. As noted above, the method of the invention may be performed in real-time or near real-time, and the thus invention makes possible real-time identification of doublets.

The method of FIG. 2 may be repeated for each pair of events in the seismic data traces.

One method of determining the overall cross-correlation coefficient of the invention will now be described, with reference to FIG. 3(*a*). The method will be described with particular reference to the case where the seismic data are or were acquired using two or more spatially separated multi-component seismic receivers. A multi-component seismic receiver contains, as is well-known, two or more sensors, with each sensor arranged to record a different component of the seismic wavefield incident on the receiver. In a land-based survey a 3-component seismic receiver is commonly used, and this is provided with three mutually orthogonal sensors. In general, a 3-component receiver is oriented in use so as to record the waveform components in the x-, y- and z-directions (with the z-direction being defined as the vertical direction). Thus, it is assumed that each of the receivers 7, 8, 9 is able to record three data traces, $D_{xi}(t)$, $D_{yi}(t)$ and $D_{zi}(t)$ which are respectively the x-, y- and z-components of a parameter of the seismic wavefield (such as the x-, y- and z-components of the particle velocity) acquired at the $i^{th}$ receiver. Each of these data traces extends from t=0 to t=T, and records the amplitude and phase of the respective component as a function of time from t=0 to t=T.

The first step in processing the seismic data is to compute cross-correlation coefficients for each of the seismic components acquired at the $i^{th}$ receiver. Thus, at step 31 of FIG. 3(*a*) the trace $D_{xi}(t)$, the x-component data for the $i^{th}$ receiver, is investigated. The trace will contain a number of events as shown schematically in FIG. 3(*b*), and at step 31 the cross-correlation coefficient between a time window $T_j$ containing event j and a time window $T_k$ containing event k is determined. This produces the cross-correlation coefficient $C^{jk}_{xi}(\tau)$—the cross-correlation coefficient between events j and k in the x-component seismic data trace acquired at the $i^{th}$ receiver. The cross-correlation coefficient $C^{jk}_{xi}(\tau)$ is a function of time lag and extends over the time-lag range from $\tau=0$ to $\tau=T$. In general, $C^{jk}_{xi}(\tau)$ will have a maximum or minimum for a certain value of the time lag. The time lag at which the cross-correlation coefficient $C^{jk}_{xi}(\tau)$ has a maximum or minimum indicates the time delay between event j and event k, and the value of the cross-correlation coefficient at its maximum or minimum is indicative of the degree of correlation between event j and event k. If events j,k form a doublet they would have similar waveforms, and so the maximum value of the cross-correlation coefficient $C^{jk}_{xi}(\tau)$ would be near to 1.

The cross-correlation coefficient $C^{jk}_{yi}(\tau)$ for the events j and k in $D_{yi}(\tau)$—the y-component seismic data trace for the $i^{th}$ receiver—is similarly obtained by cross-correlating the time window containing event j in the y-component data trace with the time window containing event k in the y-component data trace at step 32. The cross-correlation coefficient $C^{jk}_{zi}(\tau)$ for the events j and k in the z-component seismic data trace for the $i^{th}$ receiver—$D_{zi}(\tau)$—is obtained by cross-correlating the time window containing event j in the z-component data trace with the time window containing event k in the z-component data trace at step 33. Steps 31, 32 and 33 do not need to be carried out in the order described, and could in principle be performed simultaneously.

The cross-correlation coefficients $C^{jk}_{xi}(\tau)$, $C^{jk}_{yi}(\tau)$, $C^{jk}_{zi}(\tau)$ are preferably calculated in the frequency domain, according to equation (2) since, for a given computer, this is generally faster than calculating the cross-correlation coefficients in the time domain. In principle, however, the cross-correlation coefficients could be calculated in the time domain.

Next, at step 34, a combined cross-correlation coefficient for the events j and k in the data traces acquired by the $i^{th}$ receiver is derived from the individual cross-correlation coefficients for these events in the x-, y- and z-components of the seismic data acquired by the $i^{th}$ receiver. In one embodiment, the combined cross-correlation coefficient for the events j and k for the $i^{th}$ receiver is simply obtained by averaging the individual cross-correlation coefficients obtained for these events in the x-, y- and z-components of the seismic data acquired at the $i^{th}$ receiver. In a preferred embodiment, however, a weighted averaging process is used, in which the combined cross-correlation coefficient for the events j and k for the $i^{th}$ receiver, $C^{jk}_{Ri}(t)$, is determined according to:

$$C^{jk}_{Ri}(\tau) = \frac{A_x C^{jk}_{xi}(\tau) + A_y C^{jk}_{yi}(\tau) + A_z C^{jk}_{zi}(\tau)}{A_x + A_y + A_z} \quad (3)$$

In equation (3), $C^{jk}_{xi}(\tau)$, $C^{jk}_{yi}(\tau)$ and $C^{jk}_{zi}(\tau)$ are, as described above, the cross-correlation coefficients for events j and k in, respectively, the x-, y- and z-components of the seismic data acquired at the $i^{th}$ receiver, and $A_x$, $A_y$ and $A_z$ are the maximum amplitudes for, respectively, the x-, y- and z-components of the seismic data acquired at the $i^{th}$ receiver. The cross-correlation coefficient $C^{jk}_{Ri}$ is again a function of time-lag and extends over the time-lag range from $\tau=0$ to $\tau=T$.

The effect of the averaging step is to increase the weight given to a pair of events that occur, with the same time-lag or a similar time-lag, in the x-, y- and z-components of the data acquired at the $i^{th}$ receiver. A pair of events having a large cross-correlation at a certain time-lag in one component of the data, but which do not have a large cross-correlation coefficient in other components of the data, will have its importance reduced by the averaging process. Use of the weighted average of equation (3) reduces the effect of noise on the determination of the cross-correlation coefficient $C^{jk}_{Ri}(\tau)$, because of the amplitude weighting introduced by equation (3).

Next, it is determined whether the cross-correlation coefficient for the events j and k has been calculated for all receivers, at step 35. If step 35 yields a "no" determination, a suitable counter is incremented at step 36, and steps 31, 32, 33 and 34 are repeated to determine the cross-correlation coefficient $C^{jk}_{R,i+1}(\tau)$ for the events j and k for the $(i+1)^{th}$ receiver. Steps 35, 36 and 31 to 34 are repeated until a cross-correlation coefficient for the events j and k has been determined for each receiver.

The next step is to determine an overall cross-correlation coefficient from the cross-correlation coefficients for each receiver. As noted above in a seismic surveying arrangement having closely spaced receivers (for example, a receiver separation of around 50 m) the two events of a doublet should occur in seismic data acquired at all receivers with substantially the same time-lag for all receivers—and a pair of events that are recorded with a similar time-lag at each receiver will contribute to a high value for the overall cross-correlation coefficient. However, a pair of events occurring with a certain time-lag in the data acquired at one receiver but for which there is no corresponding pair of events at a similar time-lag in the data acquired at other receivers will not produce a high value for the overall cross-correlation coefficient.

In one embodiment of the invention, the overall cross-correlation coefficient $C^{jk}(\tau)$ for the events j and k is obtained by finding the average value of the coefficients $C^{jk}_{Ri}(\tau)$ for each receiver. The time-lag between the two events of a doublet is unlikely to be exactly the same in the data acquired by all receivers, however, since the source-receiver distance will be different for different receivers. Simply summing the value of the individual $C^{jk}_{Ri}(\tau)$s will generally not be effective therefore, since the delay time at which $C^{jk}_{Ri}(\tau)$ is a maximum will vary slightly from one receiver to another. In a preferred embodiment, therefore, the averaging process is carried out within a time window which takes account of the expected variation in time lag from one receiver to another. This is shown schematically in FIG. 3(*c*). The time window may be defined by a user, taking account of, for example, the receiver separation and the velocity of seismic energy in the reservoir layer.

In this embodiment, the overall cross-correlation coefficient $C^{jk}(\tau)$ for the events j and k is obtained by finding the delay time at which the average, in the chosen time window, of the coefficients $C^{jk}_{Ri}(\tau)$ for each receiver is greatest. That is:

$$C^{jk}(\tau) = \max_{\tau_i} \left\{ \frac{\sum_{i=1}^{m} C^{jk}_{Ri}(\tau_i)}{m} \right\} \quad (4)$$

In equation (4) $C^{jk}_{Ri}$ is the cross-correlation coefficient for the events j and k for the $i^{th}$ receiver, m denotes the total number of receivers, and $\tau_i \in (\tau_l - \delta t, \tau_l + \delta t)$, for l=1, . . . m.

Equation (4) includes a time window of $2\delta t$ for the time lag which, as noted above, may be defined by the user. A pair of events that occur within this window for the time-lag, in the data acquired at all receivers, will contribute to a maximum in the overall cross-correlation coefficient $C(\tau)$.

Figure 3A:
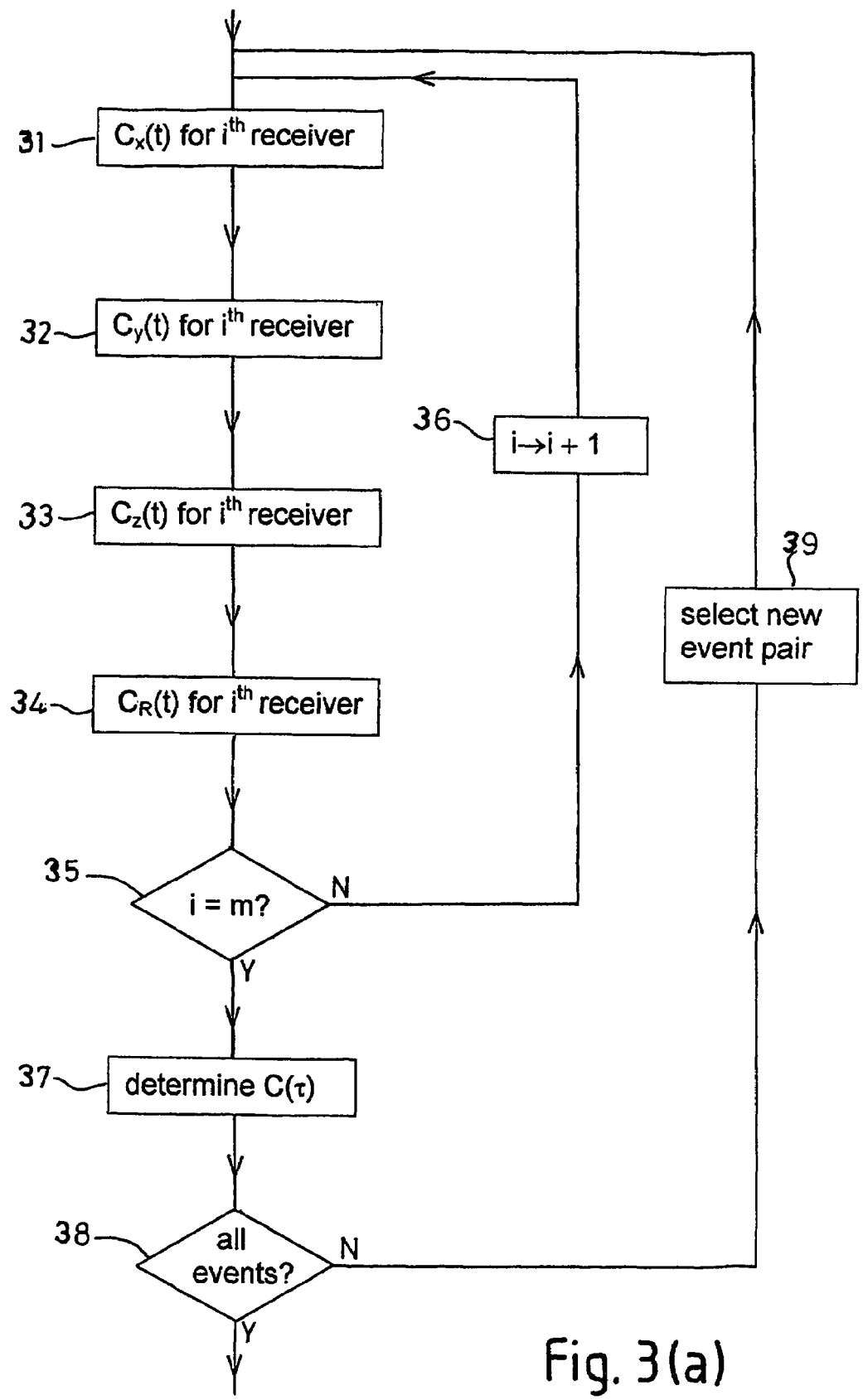
FIG. 3(*a*) is a flow diagram of one method of determining the overall cross-correlation coefficient.
Figure 3B:
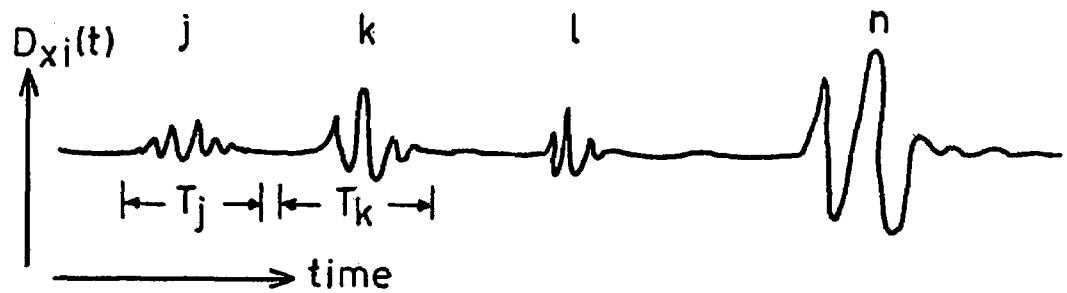
Figure 3C:
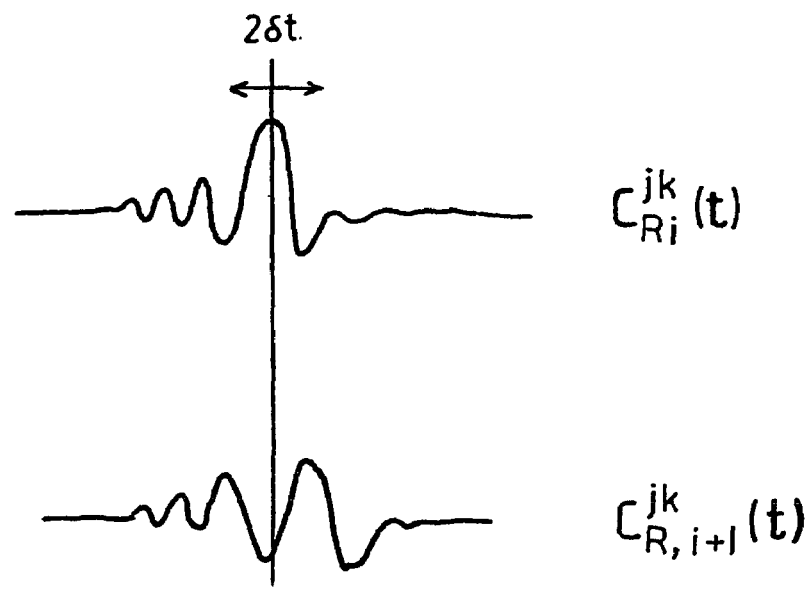

Determination of the overall cross-correlation coefficient $C^{jk}(\tau)$ is step 37 in FIG. 3(a).

This process is then repeated for other pairs of different events in the seismic data traces. (The correlation coefficient of a waveform with itself always has a peak value of 1 at zero time lag. The method is therefore preferably arranged to avoid determining the correlation coefficient of an event with itself at steps 31, 32 and 33.) This is represented schematically in FIG. 3(a) by step 38 of determining whether an overall cross-correlation coefficient has been determined for each pair of different events in the data traces and step 39 of selecting another pair of different events (such as event k and event l) in the case of a "no" determination at step 38. Steps 31-37 are then repeated for the new pair of events.

Figure 4:
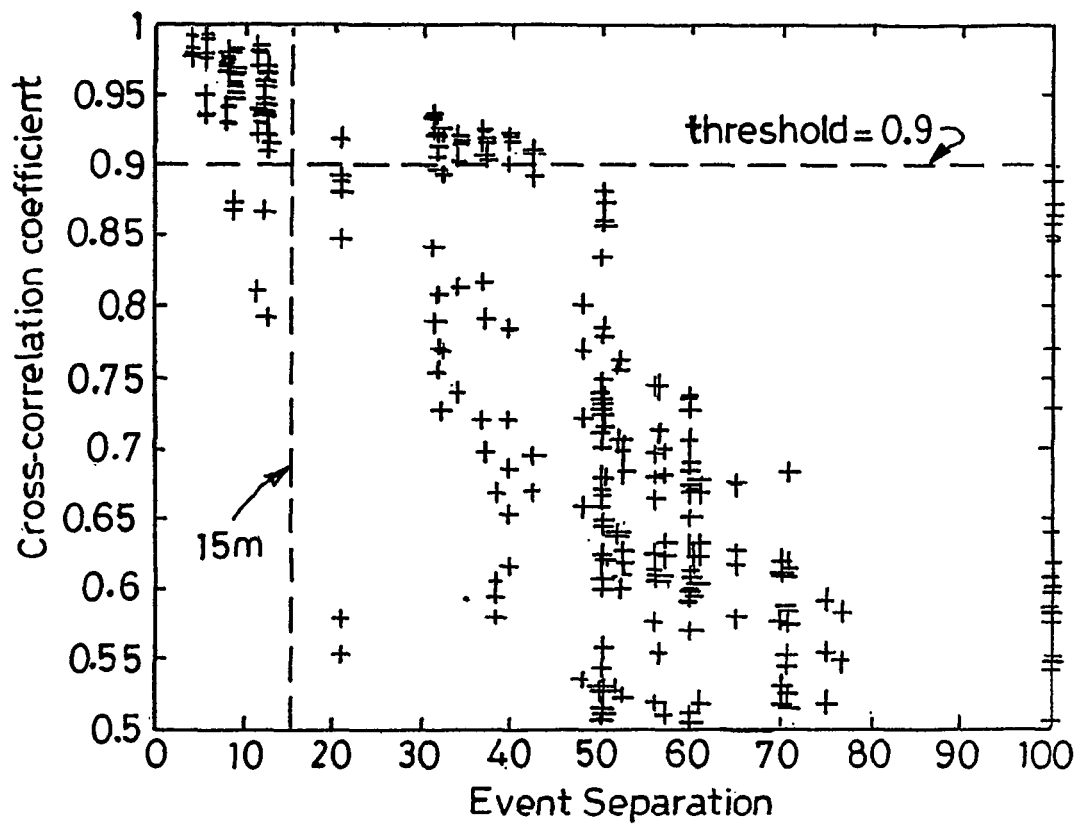
FIG. 4 illustrates results obtained by a method of the present invention when applied to a synthetic dataset.

FIG. 4 illustrates results of the method of the present invention. The results of FIG. 4 were obtained by applying the above method to a synthetic data set synthesised for a range of known event locations and a range of known source mechanisms. The data was synthesised for three receivers, arranged along a vertical line to simulate a borehole.

The simulation used 20 sources arranged at different spatial locations. The x-, y- and z-components of the seismic data acquired at each receiver as a result of emission of seismic energy at each source location were simulated.

The simulated seismic data were then cross-correlated. The cross-correlation was carried out according to the method described above—that is, a respective cross-correlation coefficient was determined for a pair of events in each of the x-, y- and z-components of the seismic data simulated for one receiver, and the combined cross-correlation coefficient for the events, for that receiver, was obtained as a weighted average of the respective cross-correlation coefficients using equation (3). The combined cross-correlation coefficient for the second receiver and third receivers were obtained in a similar way, and the overall cross-correlation coefficient for the three receivers was obtained using equation (4).

This process was repeated for every combination of two sets of data simulated for different source locations.

FIG. 4 shows the greatest magnitude of the overall cross-correlation coefficient, $C^{jk}(\tau)$, plotted against the event separation. (The event separation is the separation between the locations of the two sources used in the cross-correlation).

The two events of a doublet would be expected to have an event separation of no more than one quarter of the dominant seismic wavelength. In the simulated data used to obtain FIG. 4, the dominant frequency was approximately 100 Hz and, assuming a maximum seismic velocity of 6000 m/s, one quarter of the dominant wavelength is approximately 15 m. It is therefore expected that doublets should have an event separation of less than approximately 15 m.

FIG. 4 shows that, at event separations of less than 15 m where all of the events are assumed to be doublets, the overall cross-correlation coefficient $C(\tau)$s generally has a maximum value of greater than 0.9. At event separations of greater than 15 m, where the events are assumed to be non-doublets, the overall cross-correlation coefficients are generally lower than 0.9. It was also found that, at event separations greater than 15 m, the average of the overall cross-correlation coefficients is approximately zero indicating that, on average, no correlation exists.

It may be seen from FIG. 4 that one criteria suitable for distinguishing doublets from non-doublets would be to determine whether the overall cross-correlation coefficient is greater than 0.9. If the overall cross-correlation coefficient is $\geq 0.9$, it can be assumed that the pair of events form a doublet. In the results of FIG. 4, this criterion would correctly identify 97% of the doublets.

It will be seen in FIG. 4 that the criterion of an overall cross-correlation coefficient of greater than 0.9 identifies a few event pairs that have event separations of between 15 and 50 m as doublets. Since these events have an event separation greater than one quarter of the dominant wavelength they would not generally be regarded as doublets. They have travelled through similar earth structure, however, since the synthetic model is much simpler than the real structure of the earth. Therefore, the events may be considered as doublets for the simple earth model used in the calculations.

The results of FIG. 4 were obtained using noise-free synthetic seismic data traces. The effects of noise were investigated by adding noise to the synthetic data traces. It was found that, with increasing noise level, there was a general reduction in the magnitude of the overall cross-correlation coefficient $C(\tau)$ and that it became harder to distinguish doublets from non-doublets. For 5% added noise, results similar to those of FIG. 4 were obtained, and the 0.9 threshold for identifying muliplets was still applicable. For 10% added noise, the threshold for identifying doublets had dropped to 0.85, and increasing numbers of events with separations than 15 m were identified as doublets. When a noise level of around 20% was used, the threshold for identifying doublets had dropped further to 0.65. With a 50% noise level it was not possible to define a threshold for identifying doublets, even though there was still a noticeable difference in the nature of the cross-correlation coefficient for doublets compared to non-doublets. It was difficult to apply the method of the invention for noise levels significantly greater than 20%.

Figure 5:
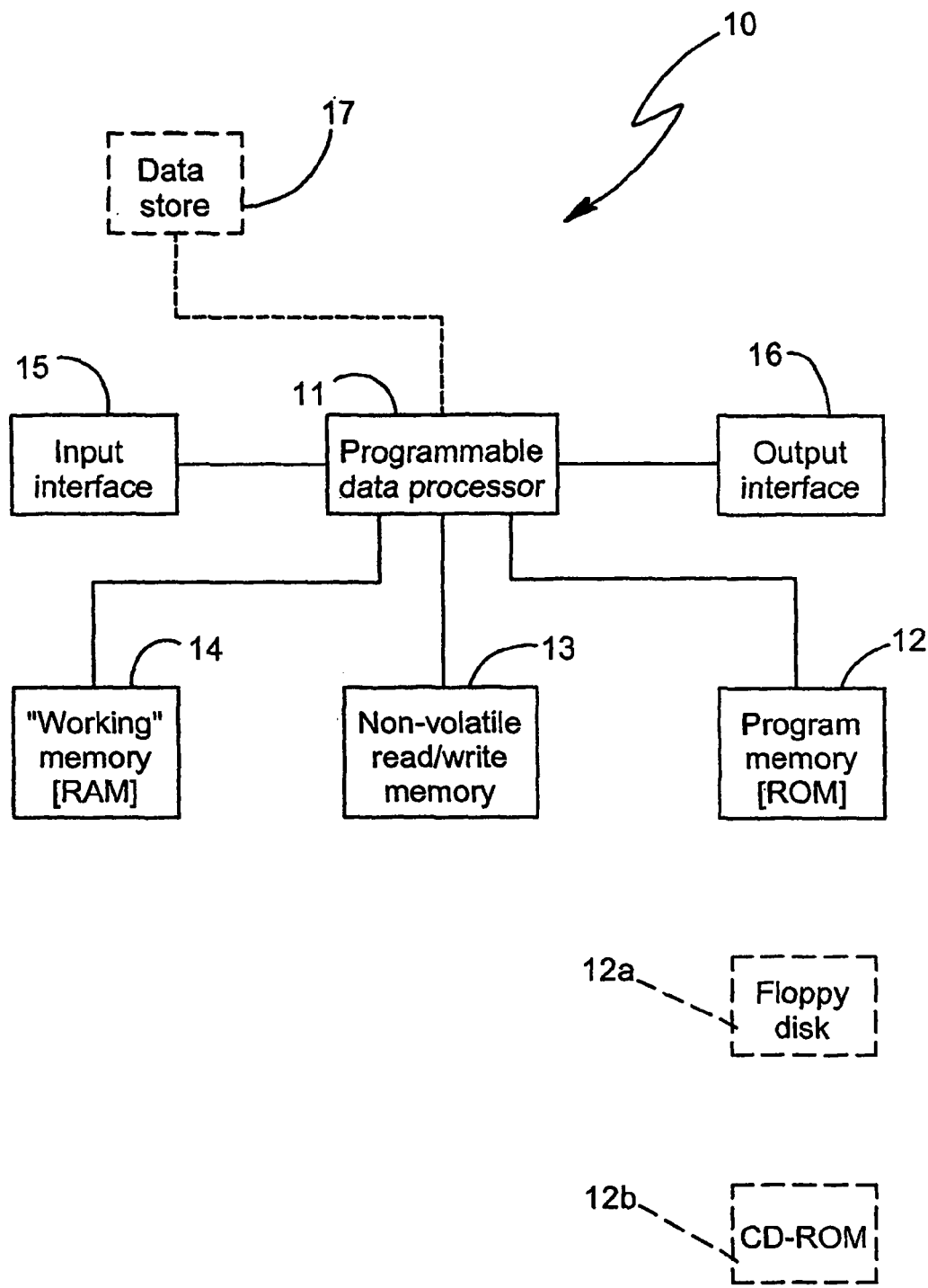
FIG. 5 is a block schematic diagram of a data processing apparatus according to the present invention.

FIG. 5 is a schematic block diagram of a programmable apparatus 10 according to the present invention. The apparatus comprises a programmable data process 11 with a programme memory 12, for instance in the form of a read-only memory (ROM), storing a programme for controlling the data processor 11 to perform any of the processing methods described above. The apparatus further comprises non-volatile read/write memory 13 for storing, for example, any data which must be retained in the absence of power supply. A "working" or scratch pad memory for the data processor is provided by a random access memory (RAM) 14. An input interface 15 is provided, for instance for receiving commands and data. An output interface 16 is provided, for instance for displaying information relating to the progress and result of the method. Seismic data for processing may be supplied via the input interface 15, or may alternatively be retrieved from a machine-readable data store 17.

The programme for operating the system and for performing the method described hereinbefore is stored in the programme memory 12, which may be embodied as a semiconductor memory, for instance of the well-known ROM type. However, the programme may be stored in any other suitable storage medium, such as magnetic data carrier 12a, such as a "floppy disk" or CD-ROM 12b.

The invention claimed is:

1. A method of identifying microseismic events generated by hydrocarbon extraction activities in seismic data, the seismic data comprising at least first seismic data traces acquired at a first seismic receiver and second seismic data traces acquired at a second receiver spatially separated from the first receiver, the method comprising:
    positioning the first and the second seismic receivers in a borehole, wherein the first and the second seismic receivers are vertically separated in the borehole;
    identifying a potential doublet in the first seismic trace by determining a first measure of similarity for a pair of microseismic events in the first seismic trace;
    using characteristics of the potential doublet to identify a corresponding potential doublet in the second seismic trace, wherein the corresponding potential doublet comprises a pair of microseismic events in the second seismic trace;
    determining a second measure of similarity between the pair of microseismic events in the second seismic trace;
    determining an overall measure of similarity, wherein the overall measure of similarity is indicative of similarity between the pair of microseismic events acquired at the first seismic receiver and of similarity between the pair of microseismic events acquired at the second seismic receiver.

2. A method as claimed in claim 1 wherein the method is a real-time processing method.

3. A method as claimed in claim 1 wherein the overall measure of similarity is an overall correlation coefficient indicative of correlation between the events acquired at the first seismic receiver and of correlation between the events acquired at the second seismic receiver.

4. A method as claimed in claim 3 wherein determining the overall correlation coefficient comprises:
    (a) determining a first correlation coefficient for the pair of microseismic events acquired at the first seismic receiver;
    (b) determining a second correlation coefficient for the pair of microseismic events acquired at the second seismic receiver; and
    (c) determining the overall correlation coefficient from the first correlation coefficient and the second correlation coefficient.

5. A method as claimed in claim 4, wherein the first seismic receiver is a multi-component seismic receiver, and step (a) comprises:
    (i) determining respective correlation coefficients for the pair of microseismic events acquired at the first seismic receiver for each data component acquired by the first seismic receiver; and
    (ii) determining the first correlation coefficient for the pair of microseismic events acquired at the first seismic receiver from the respective correlation coefficients.

6. A method as claimed in claim 5 wherein step (i) comprises determining the respective correlation coefficients in the frequency domain.

7. A method as claimed in claim 5 wherein step (ii) comprises determining the first correlation coefficient as a weighted average of the respective correlation coefficients.

8. A method as claimed in claim 4, wherein the second seismic receiver is a multi-component seismic receiver, and step (b) comprises:
    (i) determining respective correlation coefficients for the pair of seismic events acquired at the second seismic receiver for each data component acquired by the second seismic receiver; and
    (ii) determining the second correlation coefficient for the pair of seismic events acquired at the first seismic receiver from the respective correlation coefficients for each data component acquired by the second seismic receiver.

9. A method as claimed in claim 8 wherein step (i) comprises determining the respective correlation coefficients in the frequency domain.

10. A method as claimed in claim 8 wherein step (ii) comprises determining the second correlation coefficient as a weighted average of the respective correlation coefficients for each data component acquired by the second seismic receiver.

11. A method as claimed in claim 4, wherein step (c) comprises determining the overall correlation coefficient as an average of the first correlation coefficient for the pair of events acquired at the first seismic receiver and the second correlation coefficient for the pair of events acquired at the first seismic receiver.

12. A method as claimed in claim 11 and comprising determining the overall correlation coefficient according to:

$$C(\tau) = \max_{\tau_i} \left\{ \frac{\sum_{i=1}^{m} C_{Ri}(\tau_i)}{m} \right\}$$

where $C_{Ri}$ is a cross-correlation coefficient for a pair of events for an $i^{th}$ receiver, $\tau_i \in (\tau_I - \Delta t, \tau_I + \Delta t)$, for $l = 1, \ldots m$ and m is the number of receivers.

13. A method as claimed in claim 1 and comprising the further step of comparing the overall measure of similarity with a first pre-determined threshold.

14. A method as claimed in claim 13 and comprising the further step of identifying the potential doublet as a doublet if the overall measure of similarity is equal to or greater then the first predetermined threshold.

15. A method of seismic data acquisition comprising: acquiring first seismic data at a first seismic receiver and simultaneously acquiring second seismic data at a second seismic receiver spatially separated from the first seismic receiver; and processing the first and second seismic data according to a method as defined in claim 1.

* * * * *